(12) United States Patent
Wong

(10) Patent No.: US 7,979,483 B1
(45) Date of Patent: Jul. 12, 2011

(54) MULTIPLEXED PROPORTIONAL-INTEGRAL-DERIVATIVE FILTER ARCHITECTURE (MUX-PID) FOR CONTROL-LOOP APPLICATIONS

(75) Inventor: Hee Wong, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1176 days.

(21) Appl. No.: 11/506,189

(22) Filed: Aug. 16, 2006

(51) Int. Cl.
*G06F 17/10* (2006.01)
(52) U.S. Cl. ....................................................... 708/300
(58) Field of Classification Search .......... 708/300–322; 700/40–43
See application file for complete search history.

(56) References Cited

U.S. PATENT DOCUMENTS

| | | | | |
|---|---|---|---|---|
| 5,394,322 | A * | 2/1995 | Hansen | 700/37 |
| 5,754,424 | A * | 5/1998 | Melvin | 700/37 |
| 2002/0040250 | A1* | 4/2002 | Gaikwad et al. | 700/37 |
| 2004/0153173 | A1* | 8/2004 | Chang et al. | 700/37 |

OTHER PUBLICATIONS

Angel V. Peterchev et al., "Quantization Resolution and Limit Cycling in Digitally Controlled PWM Converters," IEEE Transactions on Power Electronics, vol. 18, No. 1, Jan. 2003, pp. 301-308.
Christian Kranz, "Complete Digital Control Method for PWM DCDC Boost Converter," 2003 IEEE, pp. 951-956.
Siew Kuok Hoon et al., "A Low-Power Digital PWM DC/DC Converter based on Passive Sigma-Delta Modulator," 2005 IEEE, pp. 3873-3876.
Aleksandar Prodic et al., "Digital PWM Controller and Current Estimator for a Low-Power Switching Converter," 2000 IEEE, pp. 123-128.
Office Action dated Jul. 15, 2010 in connection with U.S. Appl. No. 11/731,962.

* cited by examiner

*Primary Examiner* — Tan V Mai

(57) ABSTRACT

A multiplexed digital proportional-integral-derivative filter receives error signal samples and operates in different states during sub-cycles of a single system cycle. A single multiplier and a single adder within the filter calculate at least portions of a proportional control signal, an integral control signal and a derivative control signal for one error signal sample during successive sub-cycles. The calculated control signal portions are aggregated to produce a filtered error signal for the respective error signal sample. The original resolution at lower cost, or increased resolution at the original cost, are achieved, as well as full programmability of loop gain with only negligible increase in loop latency.

20 Claims, 9 Drawing Sheets

MULTIPLEXED PROPORTIONAL-INTEGRAL-DERIVATIVE FILTER ARCHITECTURE (MUX-PID) FOR CONTROL-LOOP APPLICATIONS

CROSS-REFERENCE TO RELATED APPLICATIONS

This application is related to the subject matter disclosed in commonly-assigned, copending U.S. patent application Ser. No. 11/731,962 entitled "GAIN CONTROL CODING WITHIN PROPORTIONAL-INTEGRAL-DERIVATIVE FILTERS FOR CONTROL-LOOP APPLICATIONS" and filed on Apr. 2, 2007. The content of the above-identified application is hereby expressly incorporated by reference.

TECHNICAL FIELD OF THE INVENTION

The present invention is directed, in general, to error signal processing for control loop applications and, more specifically, to implementing digital proportional-integral-derivative error signal filters within a control loop.

BACKGROUND OF THE INVENTION

In control systems such as switching power supplies, servo loops and robotic controllers, error detection precedes any other function within the control loop. Following error detection, the resultant error signals are shaped with a classical proportional-integral-derivative (PID) filter and fed to the controlling function for error correction. To achieve good performance under both transient and quiescent conditions, the entire signal path from error detection to the controlling function must have high resolution.

Digital rather than analog implementation of high-resolution loops offers many theoretical advantages, such as exceptional stability and programmability. In actual practice, however, digital loops never perform as well as analog loops due to circuit trade-offs in performance, size and power. On the other hand, eliminating large multipliers and adders in conventional approaches improves the cost-performance factor and thus allows digital loops to be superior to analog loops in that regard.

There is, therefore, a need in the art for cost-reducing circuit techniques in digital control loops that at least maintain the original resolution, or increase resolution while maintaining original circuit cost and power.

SUMMARY OF THE INVENTION

To address the above-discussed deficiencies of the prior art, it is a primary object of the present invention to provide, for use in switching power supplies, a multiplexed digital proportional-integral-derivative filter that receives error signal samples and operates in different states during sub-cycles of a single system cycle. A single multiplier and a single adder within the filter calculate at least portions of a proportional control signal, an integral control signal and a derivative control signal for one error signal sample during successive sub-cycles. The calculated control signal portions are aggregated to produce a filtered error signal for the respective error signal sample. The original resolution at lower cost, or increased resolution at the original cost, are achieved, as well as full programmability of loop gain with only negligible increase in loop latency.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present 110 invention, and the advantages thereof, reference is now made to the following descriptions taken in conjunction with the accompanying drawings, wherein like numbers designate like objects, and in which:

FIGS. 2CA through 2CD illustrate operation of the multiplexed digital PID filter depicted in FIG. 2C according to one embodiment of the present invention;

DETAILED DESCRIPTION OF THE INVENTION

Figure 1:
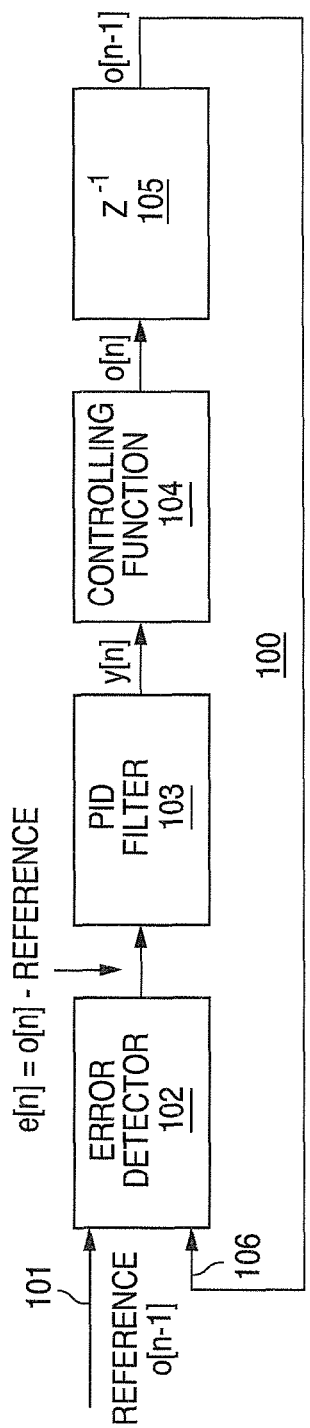
FIG. 1 is a high level block diagram of a control loop within which a multiplexed PID filter may be implemented according to one embodiment of the present invention.
Figure 2:
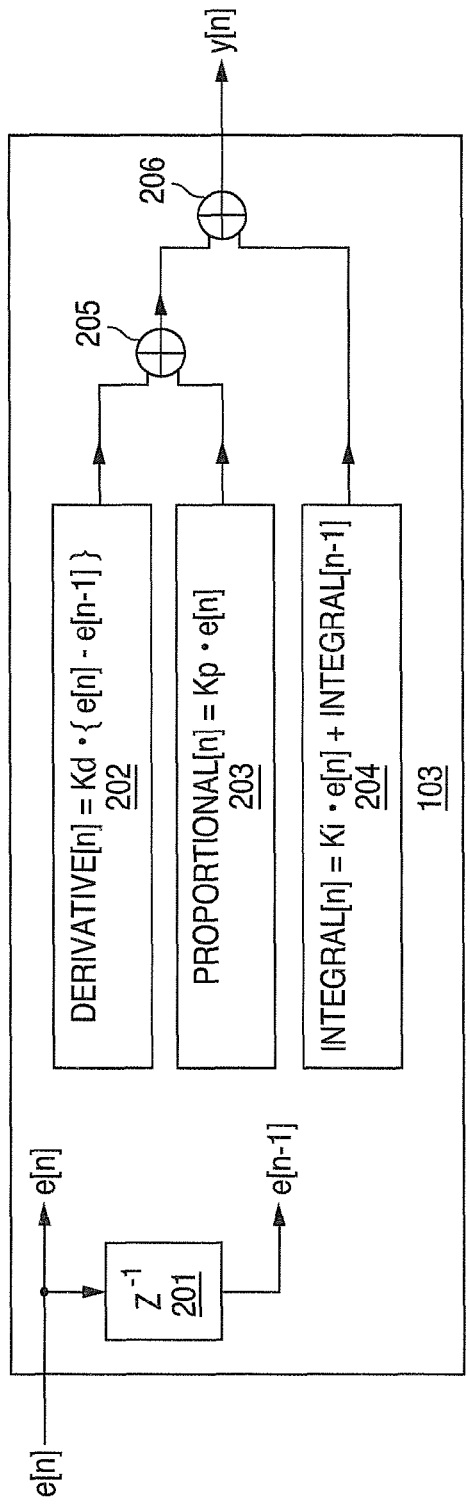
FIG. 2 is a high level block diagram of the general topology for a PID filter.
Figure 3:
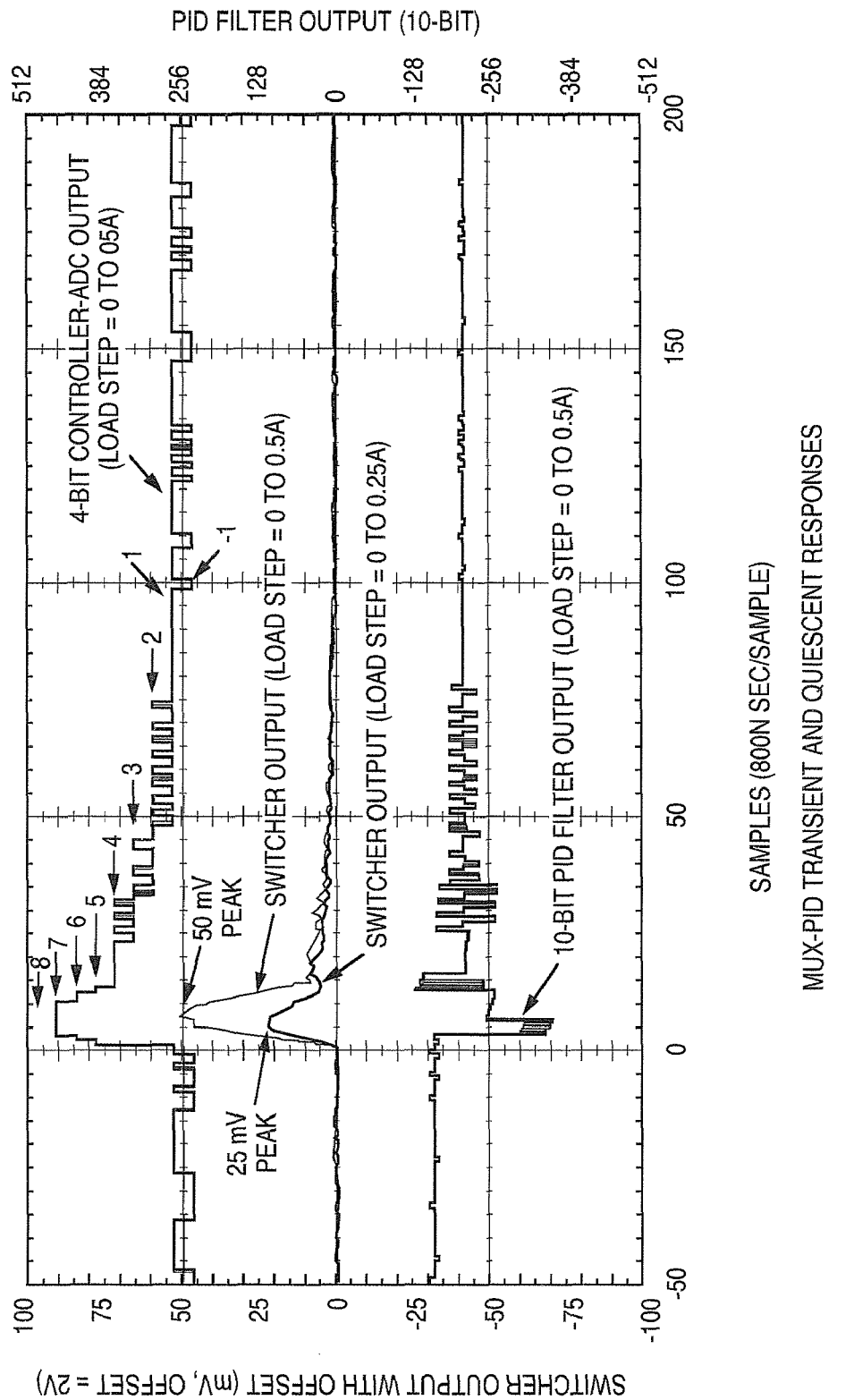
FIG. 3 is a plot of transient and quiescent responses for a multiplexed digital PID filter according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 is a high level block diagram of a control loop within which a multiplexed PID filter may be implemented according to one embodiment of the present invention. System 100 includes an input 101 for receiving a reference level signal at an error detector 102. An error signal e[n] computed as the difference between the reference level signal Reference and a feedback signal o[n−1] is produced by the error detector 102 and forwarded to a PID filter 103. PID filter 103 filters the error signal e[n] and forwards the filtered error signal y[n] to a controlling unit 104, which produces a control signal o[n]. The control signal o[n] is latched by a flip-flop 105 to produce a feedback signal o[n−1] returned to a feedback input 106 of the error detector 102. The control loop thus applies the filtered error correcting signal y[n] and modifies the loop output o[n] to minimize the magnitude of the error signal e[n].

Those skilled in the art will recognize that a complete system is not depicted in FIG. 1 or described herein. Instead, only so much of a system involving use of a PID filter as is unique to the present invention or necessary for an understanding of the present invention is depicted and described herein.

FIG. 2 is a high level block diagram of the general topology for a PID filter. PID filter 103 receives the error signal e[n] at an input thereof and latches the error signal e[n] in flip-flop 201 to retain a previous error signal e[n−1]. Both the error signal e[n] and the retained error signal e[n−1] are then routed as necessary within PID filter 103.

A derivative unit 202 within PID filter 103 computes the product of a loop-gain constant Kd times the sum of the error signal e[n] and the retained error signal e[n−1]. A proportional unit 203 within PID filter 103 computes the product of a loop-gain constant Kp times the error signal e[n]. An integral unit 204 within PID filter 103 computes the product of a loop-gain constant Ki times the sum of the error signal e[n] plus a retained state variable integral[n−1] (where integral[n] is the state variable). These signals are added by sum units 205 and 206 to produce the filtered error signal:

$$y[n]=Kd \cdot \{e[n]-e[n-1]\}+Kp \cdot e[n]+Ki \cdot e[n]+\text{integral}[n-1].$$

Figure 2A:
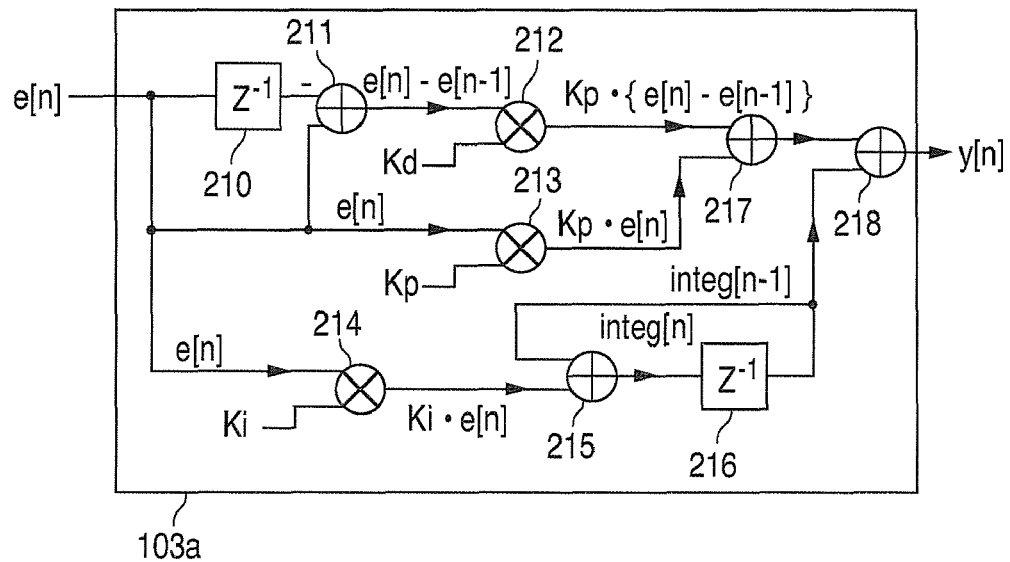
FIGS. 2A and 2B depict possible digital implementations of a PID filter.

FIG. 2A depicts one possible digital implementation of a PID filter. PID filter 103a receives the error signal e[n] at an input and latches error signal e[n−1] using a flip-flop 210. An adder 211 with one inverted input subtracts the retained error signal e[n−1] from the error signal e[n], with the result multiplied by loop gain constant Kd by multiplier 212. Multiplier 213 similarly multiplies the error signal e[n] by loop gain constant Kp, while multiplier 214 multiplies the error signal e[n] by loop gain constant Ki. Adder 215 adds the output of multiplier 214 to the feedback output of a flip-flop 216 latching integral[n−1], where integral[n] is the output of adder 215. Finally, adders 217 and 218 add the signals Kd·{e[n]−e[n−1]}, Kp·e[n], and integral [n−1] to produce:

$$y[n]=-Kd \cdot e[n-1]+Kd \cdot e[n]+K \cdot e[n]+\text{integral}[n-1] \quad (1)$$

Based on equation (1), it may be surmised that:

$$y[n-1]=[n-2]+Kd \cdot e[n-1]+Kp \cdot [n-1]\text{integral}[n-2]$$

Since $$\text{integral}[n]-\text{integral}[n-1]=Ki \cdot e[n] \quad (2)$$

and $$\text{integral}[n-1]-\text{integral}[n-2]=Ki \cdot [n-1],$$

therefore $$y[n]-y[n-1] = (Kd+Kp) \cdot e[n] - (2Kd+Kp) \cdot e[n-1] + \quad (3)$$
$$Kd \cdot e[n-2] + (\text{integral } [n-1] -$$
$$\text{integral } [n-2])$$
$$= (Kd+Kp) \cdot e[n] - (2Kd+Kp-Ki) \cdot e[n-1] +$$
$$Kd \cdot e[n-2].$$

Gain controls Kd, Kp and Ki for PID filter design 103a are available directly from individual sKd, Kp and Ki/s data paths, and the integral[n] state variable is available for test and other system functions. However, the design requires high cost and high power, and calculation of e[n]−e[n−1] requires two times the code-dynamic-range of the error signal e[n] alone, as reflected in the scaling factors (Kd+Kp) for error signal e[n] and (2Kd+Kp−Ki) for the immediately preceding error signal e[n−1] in equation (3) above.

Figure 2B:
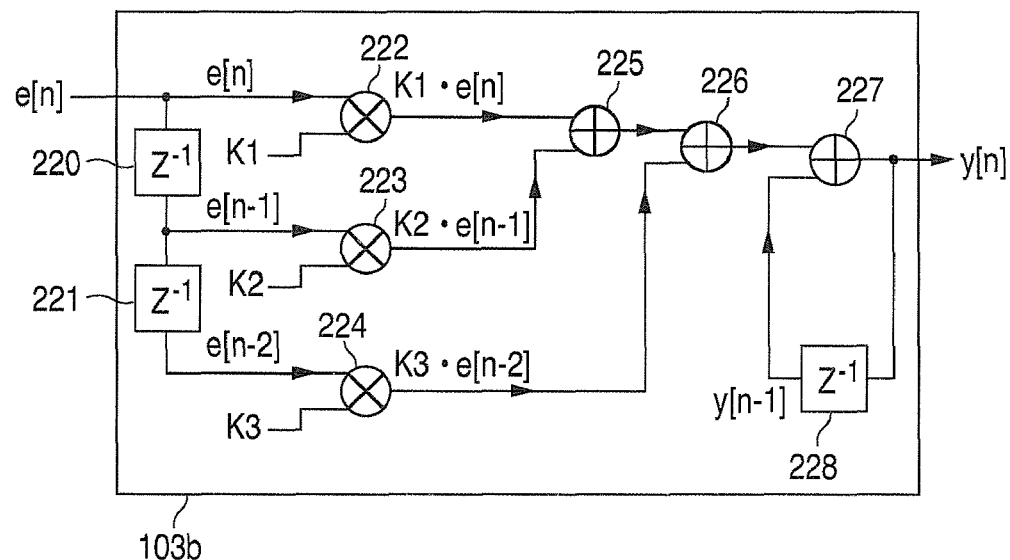

FIG. 2B depicts another possible digital implementation of a PID filter. PID filter 103b receives the error signal e[n] at an input and employs two series-connected flip-flops 220 and 221 to latch error signals e[n−1] and e[n−2]. Multipliers 222, 223 and 224 respectively multiply the error signal e[n] by a first loop gain constant K1, the immediately preceding error signal e[n−1] by a second loop gain constant K2, and the two-cycles preceding error signal e[n'12] by a third loop gain constant K3. The resulting signals K1·e[n], K2·e[n−1] and K3·e[n−2] are summed by adders 225 and 226, while adder 227 sums the filtered error signal output y[n] with a latched feedback filtered error signal y[n−1] retained by flip-flop 228. The output of adder 226 is thus represented by:

$$y[n]-y[n-1]=K1 \cdot e[n]+K2 \cdot e[n-1]+K3 \cdot e[n-2]. \quad (4)$$

Comparing equation (4) with equation (3) above, it is apparent that:

$$K1=Kd+Kp, \quad (5)$$

$$K2=-2Kd-Kp-Ki, \text{ and} \quad (6)$$

$$K3=Kd. \quad (7)$$

PID filter design 103b provides structural data paths, but again requires high cost and high power. Direct Kd, Kp and Ki loop gain controls are unavailable, and loop gain K2 requires more than two times the code-dynamic-range than is required from error signal e[n] alone, as evident from equation (6) above. In addition, the state variable integral[n] is unavailable for test and other system 255 functions, and an additional flip-flop 221 is required to latch two-cycles preceding error signal e[n−2].

Figure 2C:
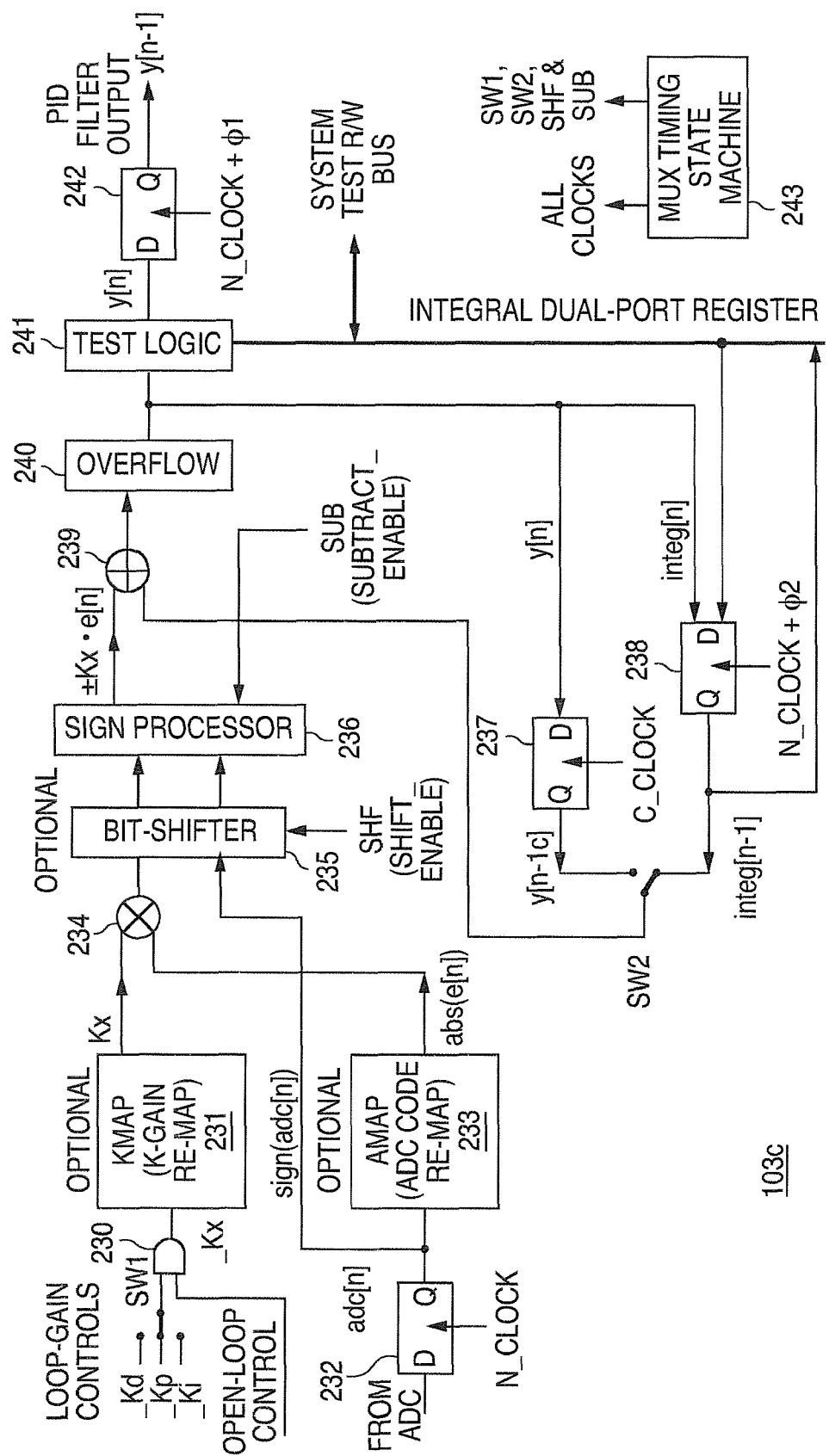
FIG. 2C depicts a multiplexed digital PID filter according to one embodiment of the present invention.
Figure 2C:
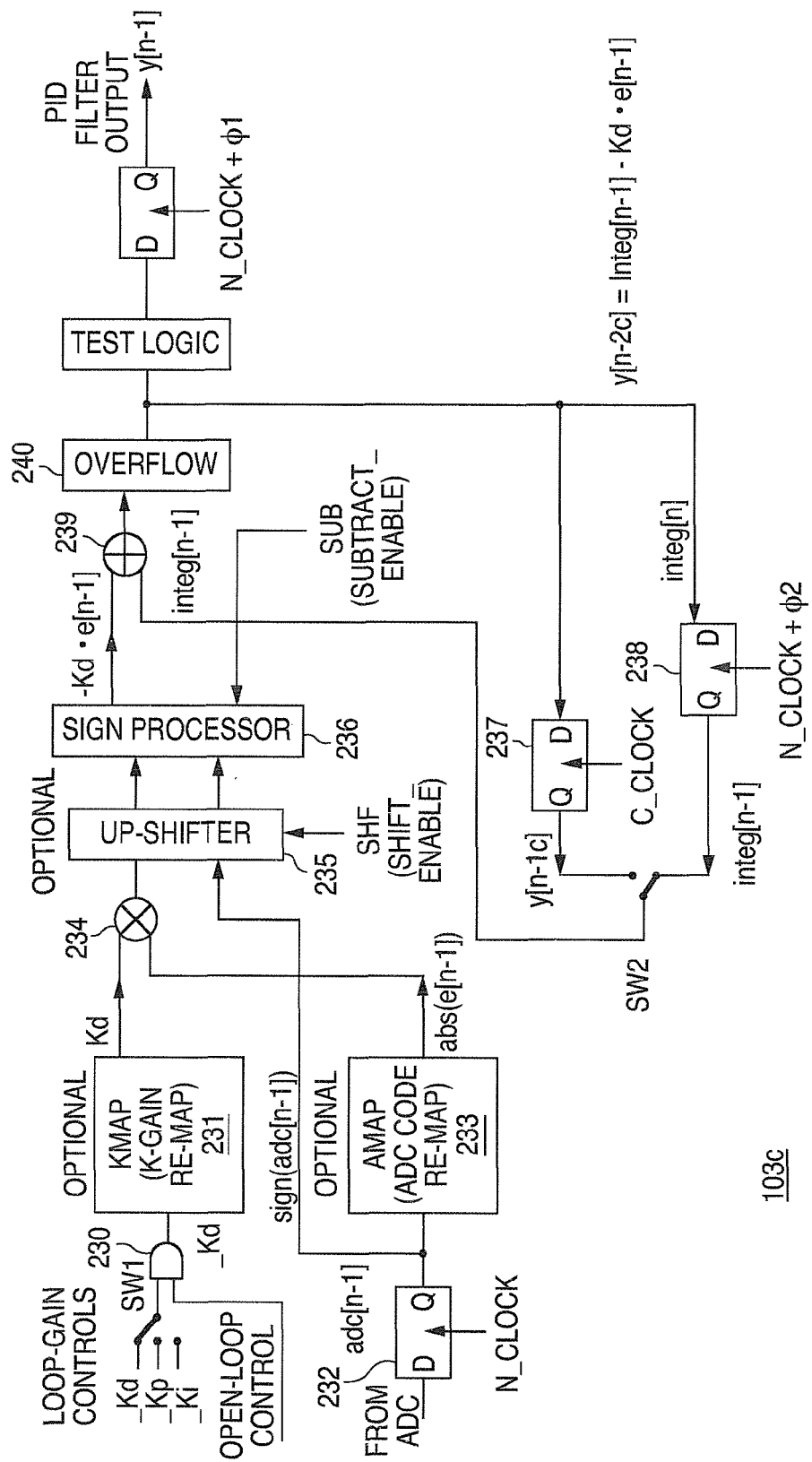
Figure 2C:
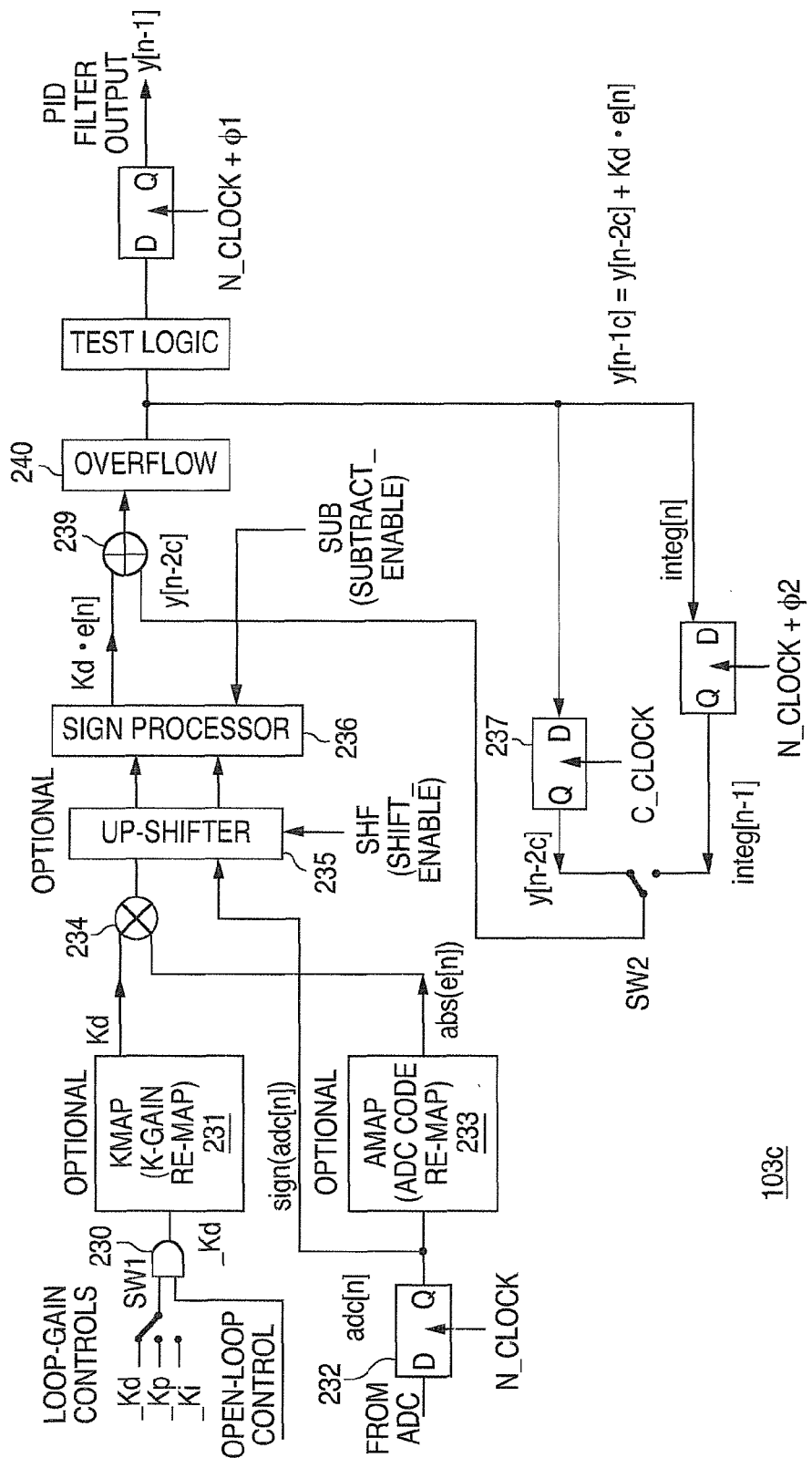
Figure 2C:
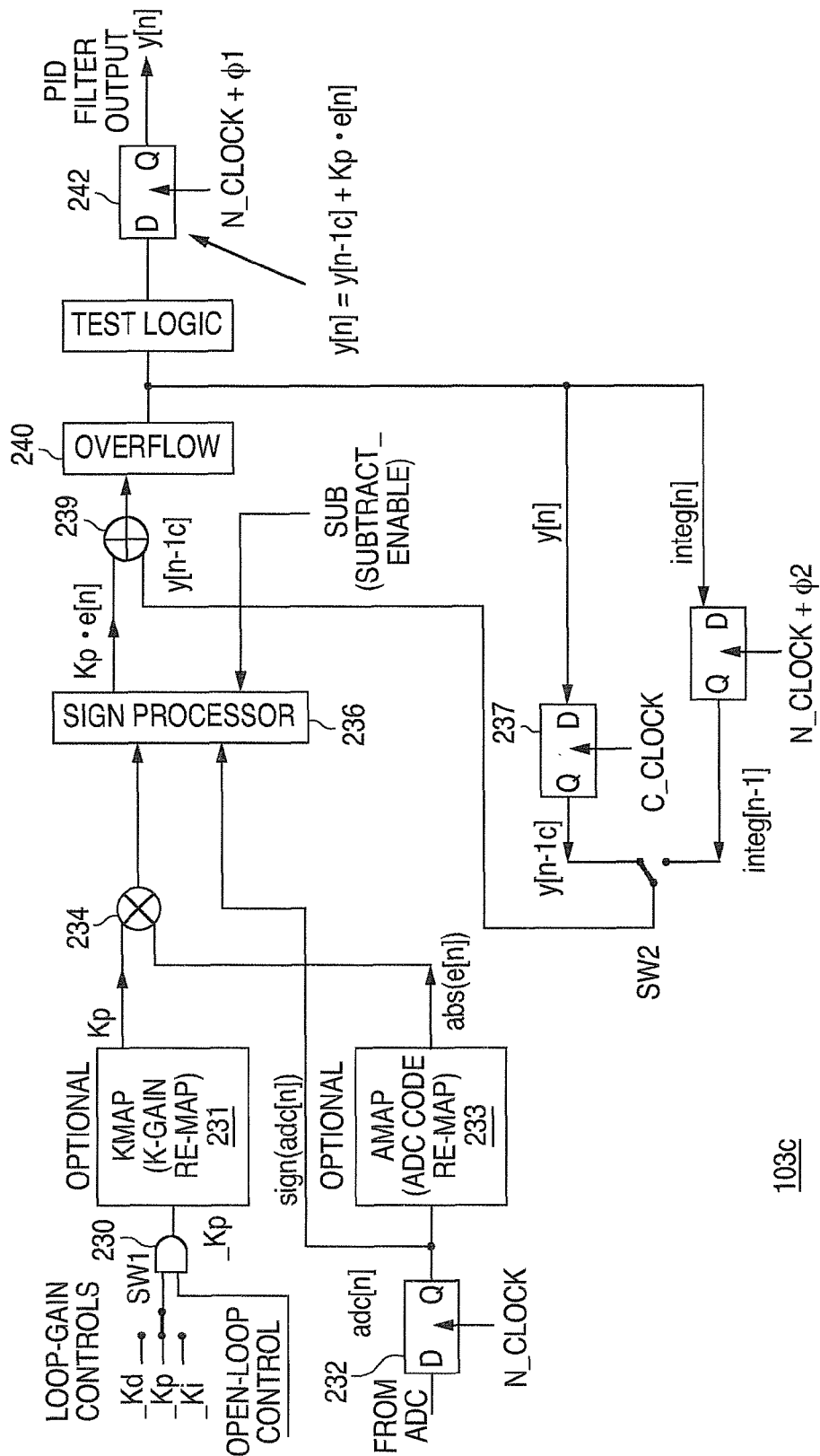
Figure 2C:
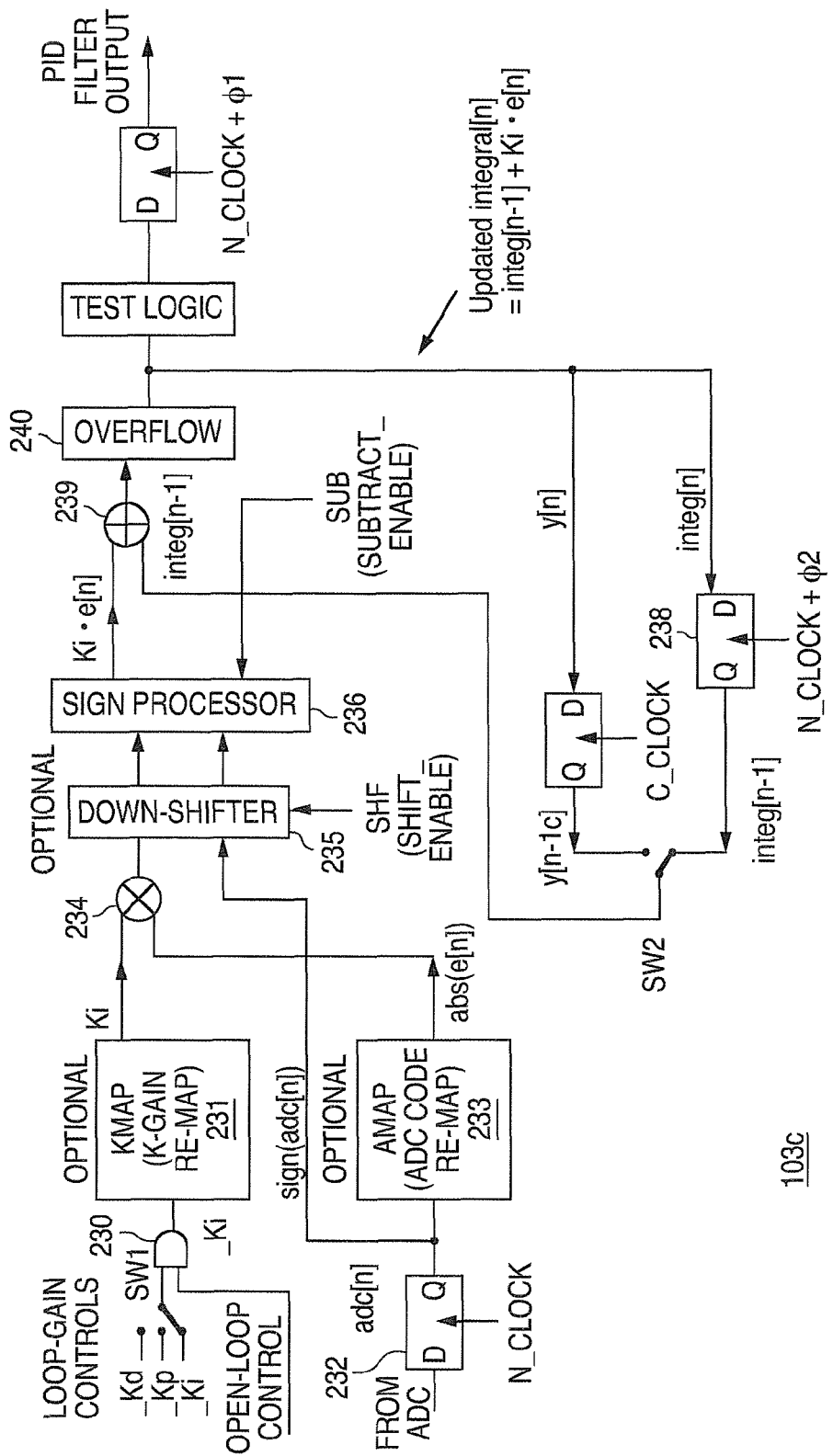

FIG. 2C depicts a multiplexed digital PID (Mux-PID) filter according to one embodiment of the present invention. Mux-PID filter 103c is multiplexed through four 260 states based on two clock signals, an internal C_clock clock signal having an exemplary frequency of 20 mega-Hertz (MHz) and the system N_clock clock signal having an exemplary frequency of 1.25 MHz. In the following description, the notation "[n-xc]" denotes a sample of the variable indicated at x C_clock periods or cycles prior to the current sample [n].

Loop gain controls _Kd, _Kp and _Ki are received at inputs to Mux-PID filter 103c and selected by switch SW1 as one input to a logic AND gate 230. The other input to AND gate 230 is an open-loop control signal, with the received loop gain output _Kx (either _Kd, _Kp or _Ki) of AND gate 230 optionally being remapped by Kmap unit 231 to loop gain Kx (either Kd, Kp or Ki). Kmap unit 231 extends the control range of _Kx using a coding method similar to that described below for code-remapping of ADC samples adc[n] by Amap unit 233.

A flip-flop 232 receives at an input thereof the output of an error signal e[n] analog-to-digital converter (ADC), which may be of the type disclosed in U.S. patent application Ser. No. 11/284,763 entitled ANALOG-TO-DIGITAL CONVERTERS FOR CONTROL LOOP APPLICATIONS and filed Nov. 21, 2005, the content of which is incorporated herein by reference. Latch 232 is clocked by N_clock signal and outputs the current sample adc[n] from the ADC. The current ADC sample adc[n] may optionally be code-remapped by Amap unit 233 to produce a magnitude or absolute value abs (e[n]) of the error signal e[n], employing a coding method of the type disclosed in the related patent application identified above. In addition, the sign value sign (adc[n]) of the error signal e[n] sample from the ADC is directly employed within Mux-PID filter 103c.

The (optionally remapped) loop gain Kx is multiplied by the (optionally code remapped) error signal e[n] (the magnitude abs(e[n]) in the example depicted) by multiplier 234. The output of multiplier 234 and the sign value sign(adc[n]) are optionally passed through a bit shifter 235 controlled by a shift enable signal Shf, then passed to sign processor 236. Sign processor 236 receives a subtract enable signal Sub controlling whether the sign of the received signal is inverted, and produces ±Kx·e[n].

A latch 237 receiving the filtered error signal y[n] at an input thereof is clock by the C_clock clock signal and outputs a signal y[n−1c]. Another latch 238 receives the signal integral[n] at an input thereof and, clocked by the N_clock clock signal plus a phase adjustment φ2, outputs the signal integral [n−1]. Switch SW2 selects between the output y[n−1c] of latch 237 and the output integral[n−1] of latch 238, and connects that selected signal to adder 239 for summing with the signal ±Kx·e[n] output by sign processor 236.

After processing by overflow unit 240, the output of adder 239 is either the filtered error signal y[n] or the state variable integral[n], depending on the phase of operation of Mux-PID filter 103c.

Test logic 241 may be connected to the output of overflow unit 240, coupled to the input and output of latch 238 when latch is implemented with an integral dual-port register addressable by the system test read/write (R/w) 320 bus. The filtered error signal y[n] from overflow unit 240 passed through test logic 241 is received by the input of latch 242, which is clocked by the N_clock clock signal plus a phase adjustment φ1 and outputs the Mux-PID filter output y[n−1].

A multiplexing timing state machine 243 produces all clock signals needed, as well as the control signals for controlling switches SW1 and SW2, the shift enable signal Shf and the subtract enable signal Sub. The states or phases of operation of Mux-PID filter 103c produce the functions given in TABLE I below:

TABLE I

| Mux-PID State | Function |
| --- | --- |
| 1 | y [n − 2c] = integ [n − 1] − Kd · e [n − 1] |
| 2 | Y [n − 1c] = y [n − 2c] + Kd · e [n] |
| 3 | Y [n] = y [n − 1c] + Kp · e [n] |
| 4 | integ [n] = integ [n − 1] + Ki · e [n] |

The phase offsets φ1 and φ2 are used to set up proper multiplex timing for the Mux-PID filter 103c. Values of three C_clock clock signal periods or cycles and four C_clock clock signal periods or cycles are employed for phase offsets φ1 and φ2, respectively, in the exemplary embodiment, similar to the corresponding parameters disclosed in U.S. patent application Ser. No. 11/204,285 entitled FINE-RESOLUTION EDGE-EXTENDING PULSE WIDTH MODULATOR and filed Aug. 14, 2005, the content of which is incorporated herein by reference.

FIGS. 2CA through 2CD illustrate operation of the multiplexed digital PID filter depicted in FIG. 2C according to one embodiment of the present invention. FIG. 2CA corresponds to the first state or phase of operation of Mux-PID filter 103c, with only the active components depicted. The first state, which may be referred to as "Derivative cycle #1," calculates integ[n−1]−Kd·e[n−1]. Switch SW1 is connected to the input receiving loop gain _Kd, while switch SW2 is connected to the output of latch 238, which retains the integral output signal integral[n−1] from Mux-PID filter state 4 of the previous system (N_clock) cycle. The error signal adc[n] from the previous system clock cycle at the output of latch 232 becomes adc[n−1]. Sign processor 236 enables subtraction by complementing ±Kx·e[n] and setting the carry-in of the following adder 239 equal to 1. The C_clock clock signal to latch 237 is enabled to save Y[n−2c] for the following Mux-PID filter state 2. The output of overflow unit 240 is thus y[n−2c]=integ[n−1]−Kd·e[n−1].

The second state, depicted in FIG. 2CB and which may be referred to as "Derivative cycle #2," reads adc[n] and adds Kd·e[n] to calculate y[n−2c]+Kd·e[n]. Switch SW1 is left connected to the input receiving loop gain _Kd, while switch SW2 is changed to connect the output of latch 237, which retains the signal y[n−2c] from the previous state, to adder 239. The signal y[n−2c] from the first state represents integral [n−1]−derivative[n−1]. The N_clock clock signal is enabled to cause latch 232 to update adc[n−1] to adc[n], and the C_clock clock signal is enable to cause latch 237 to save the signal y[n−1c] for the following state 3. The shift enable signal Shf is asserted to up-shift, allowing the bit-shifter 235 to 375 extend the control range of the received loop gain _Kd or the optionally remapped loop gain Kd, while the subtract enable signal Sub is not asserted. The output of overflow unit 240 is thus y[n−1c]=y[n−2c]+Kd·e[n].

The third state, depicted in FIG. 2CC and which may be referred to as the "Proportional cycle," adds K·e[n] to output y[n]. Switch SW1 is changed to connect to the input receiving loop gain Kp, while switch SW2 is left connected to the output of latch 237, the output from which is now the signal y[n−1c] from the preceding state 2 representing integral[n−1]−derivative[n−1]+derivative[n]. No bit shifting is performed. The output of overflow unit 240 is thus Mux-PID filter output y[n]=y[n−1c]+Kp·e[n], representing integral[n−1]−derivative[n−1]+derivative[n]+proportional[n]. The 390 signal N_clock+φ1 is enabled to output y[n].

The final state, depicted in FIG. 2CD and which may be referred to as the "Integral cycle," adds Ki·e[n] to integral[n−1] for the use in the first state of the next system (N_clock) cycle. Switch SW1 is changed to connect 395 to the input receiving loop gain Ki and switch SW2 is changed to connect to the output of latch 238, the output from which is now integral[n−1]. The shift enable signal Shf is asserted to down-shift, allowing fractional integral updates. The output of overflow unit 240 is thus integral [n]=integral [n−1]+Ki·e[n], and the signal N_clock+φ2 is enabled to save integral[n] for use during the first state of the following system clock cycle. The operation of Mux-PID filter 103c then returns, for the next system (N_clock) cycle, to the first state depicted in FIG. 2CA.

Figure 2D:
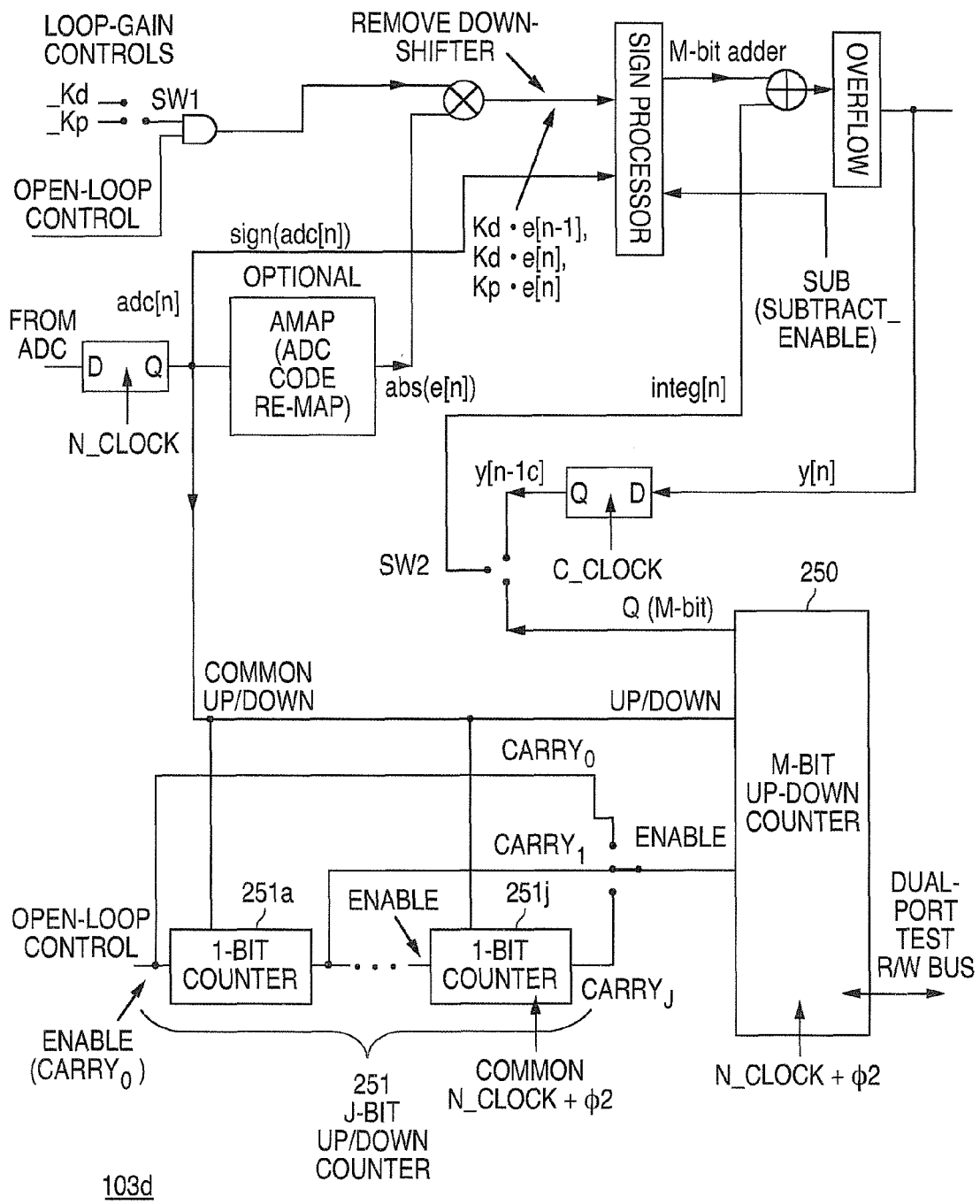
FIG. 2D depicts a multiplexed digital PID filter according to another embodiment of the present invention.

FIG. 2D depicts a multiplexed digital PID (Mux-PID) filter according to another embodiment of the present invention. Mux-PID filter 103d removes the input for receiving loop gain Ki and replaces the original D flip-flop 238 with an (M+J) bits up/down counter. The M-bit up/down counter 250 produces the M-bit count at the Q output thereof and receives a common up/down signal output by latch 232. M-bit up/down counter 250 also produces the carry selections for J-bit up/down counter 251 (implemented 415 in the example shown as a series of 1-bit counters 251a through 251j) at an enable output thereof. The carry selections for changing integral gain are set forth in TABLE II below:

TABLE II

| | |
|---|---|
| carry$_0$ | Ki = 1 |
| carry$_1$ | Ki = 0.5 |
| ... | ... |
| carry$_J$ | Ki = 0.5$^J$ |

J-bit up/down counter 251 receives the open-loop control signal as an initial input to the series of one-bit counters 251a-251j. Both M-bit up/down counter 250 and J-bit up/down counter 251 are clocked by a common N_clock+$\phi$2. Implementing M-bit up/down counter 250 as a loadable counter provides a low cost "dual port" function allowing connection to the system test R/W bus. For pulse width modulator control loops of the type described in related patent application Ser. No. 11/204,285 identified above, the M-bit up/down counter 250 is equivalent to the PWN State Counter described therein.

The integral filter function may be updated in the embodiment of FIG. 2D by either using a combination 435 of analog-to-digital converter sample adc[n] and received loop gain _Ki to change remapped Ki, or by using only the received loop gain _Ki to change remapped Ki (the low cost method).

The Mux-PID 103c or 103d disclosed employs received loop gain controls _Kd, _Kp and _Ki to cut circuit costs by using the digital PID filter approach of FIG. 2A rather than that of FIG. 2B (which requires more than twice the code-dynamic-range). Multiplexing allows a single logical AND function to gate-off all inputs for open-loop control, and the Controller ADC described in related patent application Ser. No. 11/284,763 identified above, if employed at the input to latch 232, is about one-third the size of a conventional 8-bit analog-to-digital converter. Only one level of pipeline flip-flops (latch 232) is required for both adc[n−1] and adc[n] in the design of Mux-PID 103c or 103d, while Amap unit 233 increases ADC code-dynamic-range, thus allowing low output noise or jitter and good transient characteristics with fewer ADC output bits. Processing Kd·e[n−1] and Kd−e[n] in two separate states (i.e., states 1 and 2 of FIGS. 2CA and 2CB above, rather than in a single state as Kd·e{e[n]−e[n−1]} cuts the required multiplier code-dynamic-range in half. Kmap unit 231 and bit shifter 235 extend derivative, proportional and integral control ranges while keeping the number of control bits of Kd, _Kp and _Ki low. Kmap unit 231, Amap unit 233 and multiplier 234 only process the magnitude of Kx·e[n], with the sign to abs(Kx·e[n]) inserted by sign processor 236, cutting the required multiplier dynamic range in half. Sign processor 236 performs three 465 tasks: enabling subtraction during the first state, enabling subtraction if sign (adc[n]) is negative, and loop feedback inversion. Multiplexing reduces the circuit size to about one-third of a non-multiplexed PID filter.

Since the number of input bits prior to the block consisting of Kmap unit 231, Amap unit 233 and multiplier 234 (e.g., three input bits to Amap unit 233, four input bits to Kmap unit 231 and one input bit for open loop control), that block can be synthesized using a small, two-level AND-OR logic circuit without using expensive multipliers. The common overflow logic 240 reduces circuit overhead and prevents adder wrap-around upon high derivative signal peaks. The integral dual-port R/W register is available for system test and other system functions. However, some circuit overhead is required for multiplexing, such as D flip-flop 237. switches SW1 and SW2 and state controller 243.

FIG. 3 is a plot of transient and quiescent responses for a multiplexed digital PID filter according to one embodiment of the present invention. The response of a 4-bit Controller ADC implemented as described in related patent application Ser. No. 11/284,763 identified above and including a 10-bit Mux-PID filter 103c or 103d is plotted at the top of FIG. 3 for a load step from 0 to 0.5 Amps (A). Switcher outputs for load steps from 0 to 0.5 A and from 0 to 0.25 A are plotted in the center of FIG. 3, while output of the Mux-PID filter 103c or 103d for the load step from 0 to 0.5 A is plotted at the bottom.

In designing single-chip controllers, the analog approach still dominates due to superb performance and cost 495 characteristics relative to digital designs, a fact apparent in switching power source designs. Although digital switchers have been proposed, the proposed designs rarely exhibit satisfactory performance under both transient and quiescent conditions, with a major deficiency 500 found to be inadequate resolution. Increasing bit-resolution does not eliminate the deficiency because of the high circuit costs over existing analog systems. Adding programmable PID filter gain controls would further increase system cost beyond acceptable levels.

The Mux-PID design described herein, even including full PID programmability, exhibits enormous cost savings. In addition, no circuit compromises sacrificing system performance need be made, with the sole exception of multiplexing cycle time slightly increasing loop latency. However, that latency overhead, rather than being a significant disadvantage, usually causes negligible performance degradation in most designs. The Mux-PID filter architecture disclosed is comparable to existing analog methods, making single-chip controllers cost effective. The Mux-PID architecture thus provides a cost effective platform for designing a wide variety of low cost, high performance single-chip controllers.

The Mux-PID digital filter architecture for control loop applications employs a multiplexing scheme to process three control signals: proportional, integral and derivative, with several circuit enhancements improving loop performance. For a power switching regulator application, the Mux-PID receives a 4-bit error signal e[n] from a Controller ADC implemented as described in related patent application Ser. No. 11/284,763 identified above and provides ADC code conversion, programmable loop gain processing, PID multiplexing and adder sign and overflow manipulation. The output of the Mux-PID is a 10-bit control signal, by which the Mux-PID drives a digital pulse width modulator including a dither circuit as described in U.S. patent application Ser. No. 11/204,297 entitled DITHER SCHEME USING PULSE-DENSITY MODULATION (DITHER PDM) and filed Aug. 14, 2005 and a dead-time circuit of the type described in U.S. patent application Ser. No. 11/204,284 entitled DIGITAL DEAD-TIME CONTROLLER FOR PULSE WIDTH MODULATORS and filed Aug. 14, 2005, which are incorporated herein by reference.

Within such a system, a coding algorithm may be designed to enhanced tracking and transient performances with a low resolution ADC and a low resolution filter, which techniques are also applicable to non-multiplexed PID filter architectures. Referring back to FIG. 2C, an exemplary implementation of Mux-PID 103c employs programmable PID gain controls _Kd, _Kp and _Ki that are four bits each. The selected gain control _Kx is logically ANDed with a common open loop control signal using a 4-bit AND gate 230. As a result, the output of AND gate 230 represents 4096 PID settings at 12-bit resolution.

The input to latch 232 is a four bit signal from a Controller ADC of the type described in related patent application Ser. No. 11/284,763 identified above, providing 16 possible error signal levels, signed to include negative values. The remapped error signal codes from Amap unit 233 are 5-bit, unsigned values. The output of multiplier 234 is an 8-bit, unsigned value, and the output of bit shifter 235 is a 13-bit, unsigned value (excluding the sign bits passed through bit shifter 235). Bit shifter 235 multiplies derivative values by 2 and proportional values by 1, while dividing integral values by 16. The inputs and outputs to adder 239, overflow unit 240 latches 237 and 238 are 14-bit signed values, but the Mux-PID output y[n] transmitted by test logic is the 10 most significant bits (MSBs) of the 14-bit signed output from overflow unit 240, producing a 10-bit dither pulse width modulator (DPWM) control signal.

In the exemplary embodiment, latch 232 is implemented by four D flip-flops, latches 237 and 238 are implemented by 28 (14×2) D flip-flops, and latch 242 is implemented by 10 D flip-flops. Multiplier 239 and overflow unit 240 are implemented by a standard 14-bit adder with clipping upon overflow and underflow, and the test logic 241 is user-defined.

The Mux-PID hardware and coding combination described above provides a high performance solution for implementing digital power controllers. Featuring a programmable PID gain control at a fractional cost of conventional approaches, the design also provides good tracking and good transient loop performances with a low-cost and low-resolution ADC and PID filter. The implementation is robust, with the front-end Controller ADC employing a single comparator in a single signal processing path with no concerns of differential signal mismatches. The Mux-PID filter receives digitized data from the Controller ADC and all signals are processed in the digital domain. Finally, the Mux-PID architecture allows an all-synchronous logic implementation, such that a trouble-free and low-risk solution is readily achievable.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A multiplexed digital proportional-integral-derivative filter comprising:
an input configured to receive error signal samples; and
a single multiplier and a single adder, wherein for each error signal sample, the multiplier and adder are configured to:
calculate at least portions of a proportional control signal, an integral control signal and a derivative control signal for the respective error signal sample during successive portions of a system cycle, and
aggregate the calculated proportional control signal, integral control signal and derivative control signal to produce a filtered error signal for the respective error signal sample.

2. The filter according to claim 1, further comprising:
a first switch configured to selectively route one of three received loop gain signals to the single multiplier.

3. The filter according to claim 2, further comprising:
a gain mapping unit coupled between the first switch and the single multiplier, the gain mapping unit configured to operate in conjunction with a bit shifter to selectively extend a control range of the received loop gain signals.

4. The filter according to claim 3, further comprising:
a sign processor configured to selectively alter a sign of a value output by the bit shifter.

5. The filter according to claim 4, further comprising:
a second switch configured to route one of a filtered error signal and an integrated error signal to the adder for summation with a scaled error signal.

6. The filter according to claim 5, further comprising:
a state machine configured to produce clock signals for the filter and to control the first and second switches, an enable signal for the bit shifter, and a control signal for the sign processor.

7. The filter according to claim 2, further comprising:
a second switch configured to route one of a filtered error signal and an integrated error signal to the adder for summation with a scaled error signal.

8. The filter according to claim 1, further comprising:
a latch configured to receive a current sample from an analog-to-digital converter; and
a code mapping unit configured to selectively remap received error signals.

9. A method of multiplexed digital proportional-integral-derivative filtering comprising:
receiving error signal samples; and
for each error signal, utilizing a single multiplier and a single adder to:
calculate at least portions of a proportional control signal, an integral control signal and a derivative control signal for the respective error signal sample during successive portions of a system cycle, and
aggregate the calculated proportional control signal, integral control signal and derivative control signal to produce a filtered error signal for the respective error signal sample.

10. The method according to claim 9, further comprising:
selectively controlling a first switch routing one of three received loop gain signals to the single multiplier.

11. The method according to claim 10, further comprising:
operating a gain mapping unit coupled between the first switch and the single multiplier, the gain mapping unit operating in conjunction with a bit shifter to selectively extend a control range of the received loop gain signals.

12. The method according to claim 11, further comprising:
utilizing a sign processor to selectively alter a sign of a value output by the bit shifter.

13. The method according to claim 12, further comprising:
selectively controlling a second switch routing one of a filtered error signal and an integrated error signal to the adder for summation with a scaled error signal.

14. The method according to claim 13, further comprising:
employing a state machine to produce clock signals for the filter and to control the first and second switches, an enable signal for the bit shifter, and a control signal for the sign processor.

15. The method according to claim 10, further comprising:
selectively controlling a second switch routing one of a filtered error signal and an integrated error signal to the adder for summation with a scaled error signal.

16. The method according to claim 9, further comprising:

latching a current sample from an analog-to-digital converter; and selectively remapping received error signals.

17. A filter comprising:

an input configured to receive error signal samples;

a first switch configured to selectively route one of three received loop gain signals to a multiplier that is configured to receive signals representative of the received error signal samples for scaling of the representative signals by a value representative of the selected loop gain signal;

a sign processor configured to selectively control a sign of a value derived from an output of the multiplier; and a second switch configured to route one of a filtered error signal and an integrated error signal to an adder for summation with the value derived from the multiplier output, wherein the multiplier and the adder are configured to collectively:

calculate at least portions of a proportional control signal, an integral control signal and a derivative control signal for the respective error signal sample during successive portions of a system cycle, and aggregate the calculated proportional control signal, integral control signal and derivative control signal to produce the filtered error signal for the respective error signal sample.

18. The filter according to claim 17, further comprising:

a gain mapping unit coupled between the first switch and the multiplier, the gain mapping unit configured to produce the value representative of the selected loop gain signal; and a bit shifter configured to selectively shift the output of the multiplier to produce the value derived from the multiplier output, the gain mapping unit configured to operate in conjunction with the bit shifter to selectively extend a control range of the received loop gain signals.

19. The filter according to claim 18, further comprising:

a latch configured to receive a current error signal sample from an analog-to-digital converter; and a code mapping unit configured to selectively remap received error signal samples to produce the representative signals.

20. The filter according to claim 19, further comprising:

a state machine configured to produce clock signals for the filter and controlling the first and second switches, an enable signal for the bit shifter, and a control signal for the sign processor.

* * * * *